United States Patent
Sabo

(10) Patent No.: US 11,644,057 B2
(45) Date of Patent: May 9, 2023

(54) REUSABLE RELEASE MECHANISM

(71) Applicant: NORTHROP GRUMMAN SYSTEMS CORPORATION, Falls Church, VA (US)

(72) Inventor: Scott G. Sabo, Long Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 462 days.

(21) Appl. No.: 16/852,852

(22) Filed: Apr. 20, 2020

(65) Prior Publication Data
US 2021/0324888 A1 Oct. 21, 2021

(51) Int. Cl.
*F16B 21/16* (2006.01)
*F16B 21/02* (2006.01)
*B64G 1/22* (2006.01)

(52) U.S. Cl.
CPC ............ *F16B 21/165* (2013.01); *B64G 1/222* (2013.01); *F16B 21/02* (2013.01); *Y10T 403/592* (2015.01)

(58) Field of Classification Search
CPC .. B23B 31/1071; B25J 15/0416; B64G 1/222; F16B 2/16; F16B 21/02; F16B 21/165; Y10S 403/03; Y10S 403/04; Y10T 403/58; Y10T 403/587; Y10T 403/592; Y10T 403/598; Y10T 403/7005; Y10T 403/7015
USPC ............ 403/315, 319, 322.2, 324, 348, 353, 403/DIG. 3, DIG. 4
See application file for complete search history.

(56) References Cited

U.S. PATENT DOCUMENTS

| | | | |
|---|---|---|---|
| 4,708,548 A | | 11/1987 | Taylor et al. |
| 5,088,767 A | * | 2/1992 | Hoblingre ............... F16B 2/16 280/775 |
| 8,601,667 B2 | | 12/2013 | Norton |
| 8,794,418 B1 | * | 8/2014 | Norton ............... B25J 17/0208 901/29 |
| 8,876,142 B1 | * | 11/2014 | Karasch ............... B60D 1/075 403/322.2 |
| 10,047,908 B1 | | 8/2018 | Bohle, II et al. |
| 2003/0066667 A1 | | 4/2003 | Zhang |

FOREIGN PATENT DOCUMENTS

| | | | | |
|---|---|---|---|---|
| DE | 4108593 A1 | * | 9/1992 | ............... F16B 2/16 |
| FR | 2786520 A1 | * | 6/2000 | ......... B60N 2/01533 |

* cited by examiner

*Primary Examiner* — Josh Skroupa
(74) *Attorney, Agent, or Firm* — John A. Miller; Shumaker, Loop & Kendrick, LLP

(57) ABSTRACT

A release mechanism for releasably securing a releasable structure to a stationary structure, where the mechanism employs release balls that can re-secure the releasable structure to the stationary structure. The release mechanism includes a base portion having three rails extending radially outward from a center of the base portion, and a rotatable portion rotatably mounted to the base portion, where the rotatable portion has a cam indentation. The release balls are positioned between the base portion and the rotatable portion so that one of the release balls is ridable on each of the rails and all of the release balls are positioned within the cam indentation. The cam indentation is configured so that as the rotatable portion is rotated relative to the base portion the cam indentation causes and allows the release balls to move along the rails in unison with each other to hold and release the releasable structure.

20 Claims, 5 Drawing Sheets

REUSABLE RELEASE MECHANISM

GOVERNMENT CONTRACT

The Government of the United States of America has rights in this invention pursuant to a U.S. Government contract.

BACKGROUND

Field

This disclosure relates generally to a reusable release mechanism and, more particularly, to a reusable release mechanism for releasably securing a releasable structure to a stationary structure, where the mechanism employs slidable release balls that can re-secure the releasable structure to the stationary structure.

Discussion of the Related Art

Various applications, for example, spacecraft applications, require a releasable joint mechanism, such as a non-explosive actuator (NEA), where typically a bolt having a head is secured to a releasable structure and is releasably mounted to a stationary structure. In one known design, the bolt extends through a bore in the stationary structure, where the head of the bolt is prevented from passing through the bore by a three-piece split washer. A wire is wrapped around the washer to hold the pieces together, where the wire is under compression, and a fusible link holds the wire in compression. A current is applied to the link to melt it and release the wire, which causes the pieces of the washer to separate and allow the head of the bolt to pass through the bore under a certain force, such as a spring force or gravity, thus releasing the releasable structure from the stationary structure. However, in this and other similar designs, once the releasable structure is released, the joint is not reusable for re-securing the releasable structure to the stationary structure.

There may be various applications for joint mechanisms of the type discussed above where it is desirable to reuse the joint mechanism in a manner that allows the releasable structure to be re-secured to the stationary structure, for example, to save cost, the mechanism may not be accessible, and other benefits.

DETAILED DESCRIPTION OF THE EMBODIMENTS

The following discussion of the embodiments of the disclosure directed to a reusable release mechanism for releasably securing a releasable structure to a stationary structure, where the mechanism employs slidable release balls that can re-secure the releasable structure to the stationary structure is merely exemplary in nature, and is in no way intended to limit the disclosure or its applications or uses.

Figure 1:
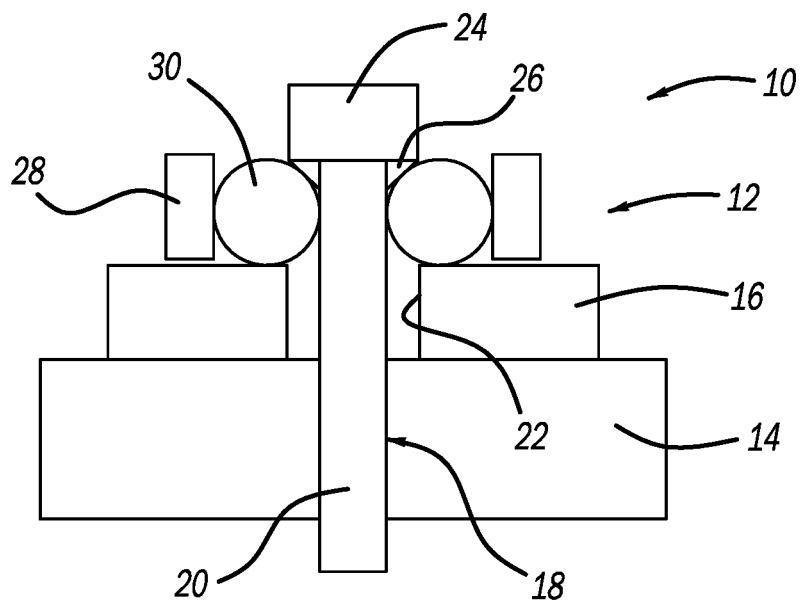
FIG. 1 is a side view illustration of a release joint assembly showing a releasable structure being releasably secured to a stationary structure by a reusable release mechanism.
Figure 2:
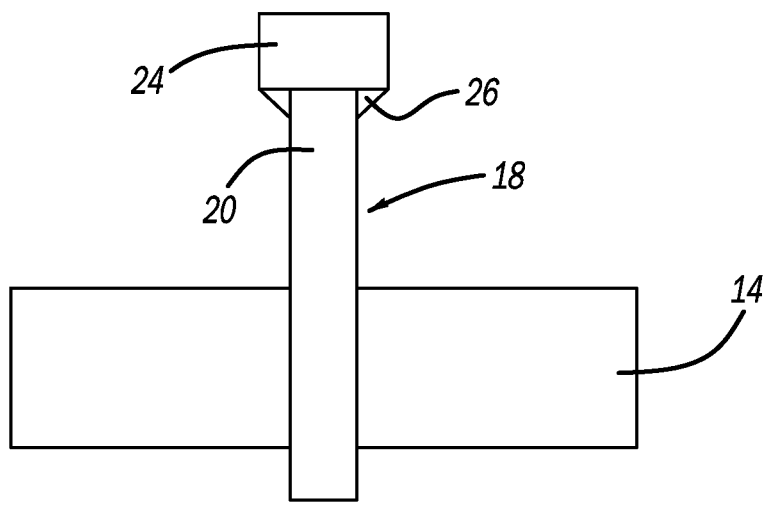
FIG. 2 is an exploded side view illustration of the release joint assembly shown in FIG. 1 and illustrating the releasable structure being released from the stationary structure.

FIG. 1 is a side view illustration of a release joint assembly 10 showing a simplified reusable release mechanism 12 for releasably securing a releasable structure 14 to a stationary structure 16. The release joint assembly 10 includes a bolt 18 having a bolt shaft 20 extending through a bore 22 in the structure 16 and being secured to the stationary structure 16, where the bolt 18 includes a bolt head 24 having an angular collar 26, and where the diameter of the bolt head 24 allows it to slide through the bore 22. The mechanism 12 includes a wall structure 28 that pushes release balls 30 towards the shaft 20 and in contact with the collar 26 to prevent the bolt 18 from sliding through the bore 22 and releasing the structure 14. Moving the wall structure 28 away from the release balls 30 allows the release balls 30 to move away from the bolt 18 and allows the bolt 18 to slide through the bore 22 and release the releasable structure 14 from the stationary structure 16, as shown in FIG. 2.

Figure 3:
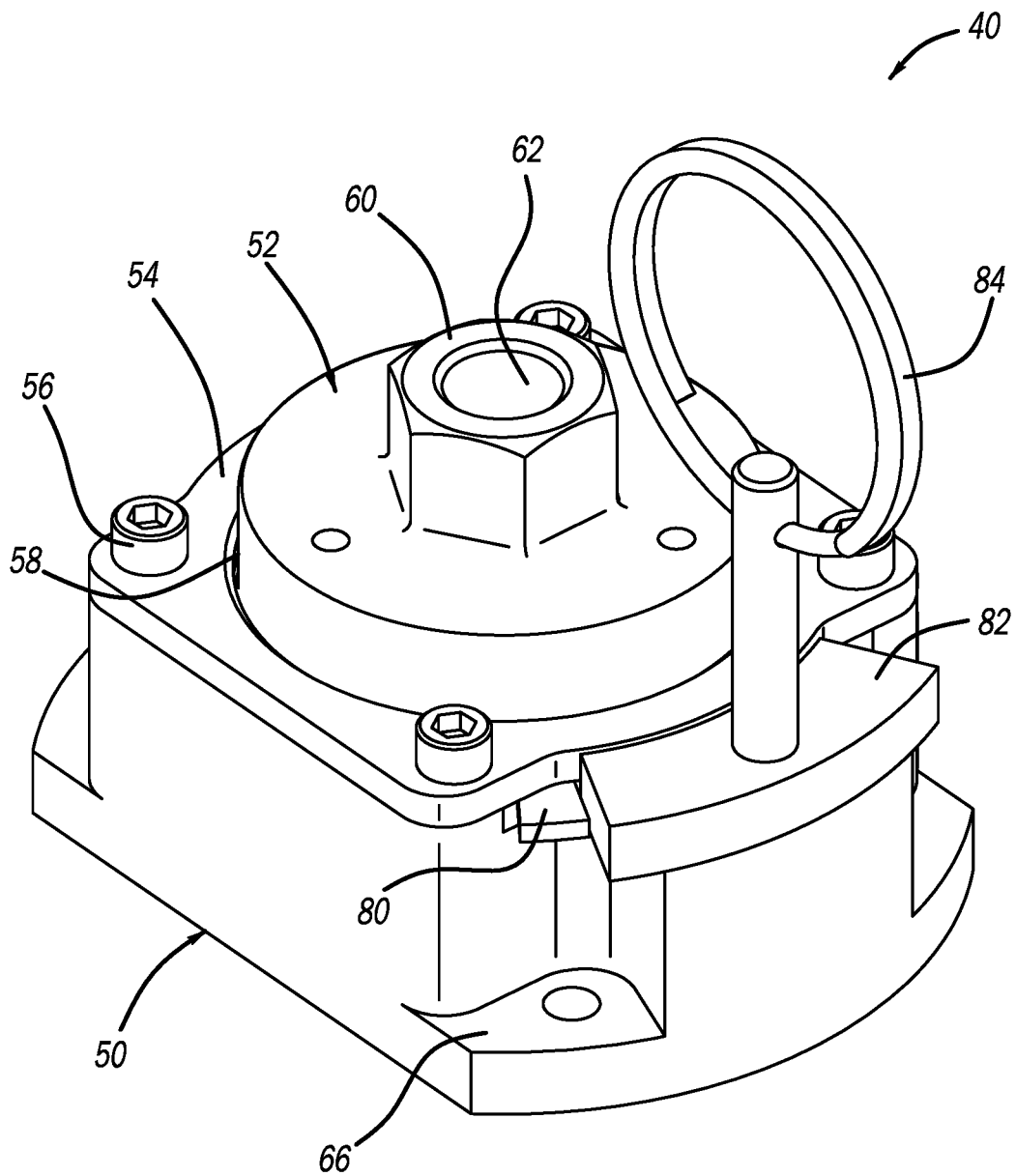
FIG. 3 is an isometric view of a reusable release mechanism of the type shown in FIG. 1.
Figure 4:
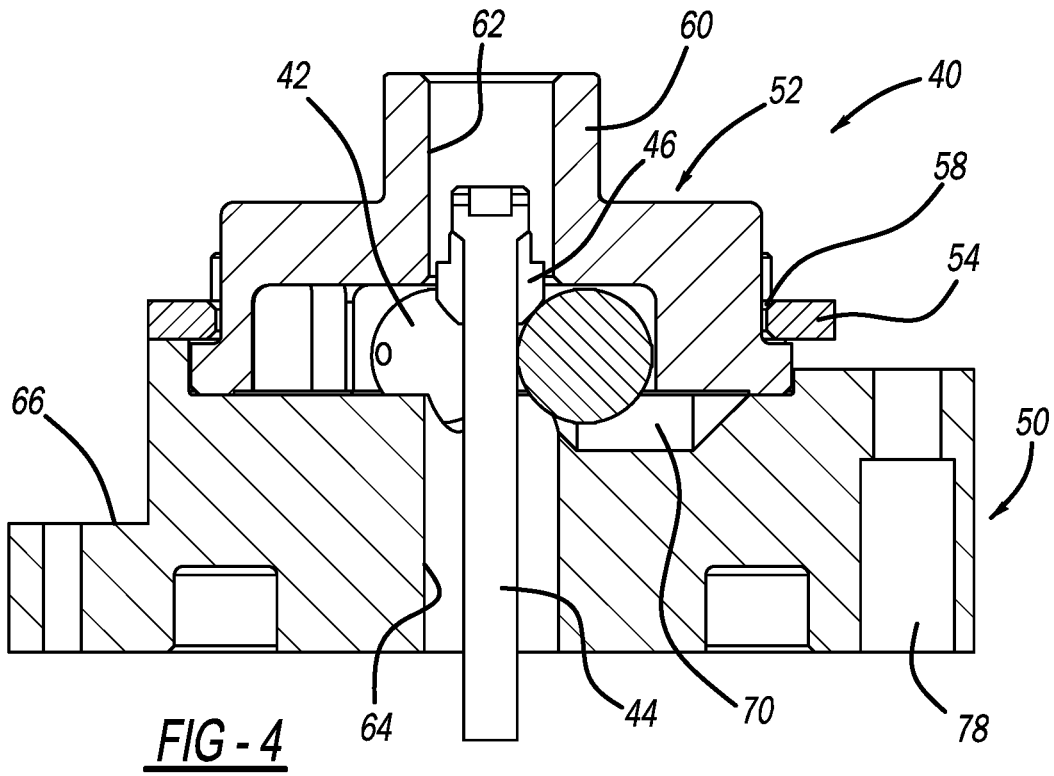
FIG. 4 is a cross-sectional view of the reusable release mechanism shown in FIG. 3 in a latched state.
Figure 5:
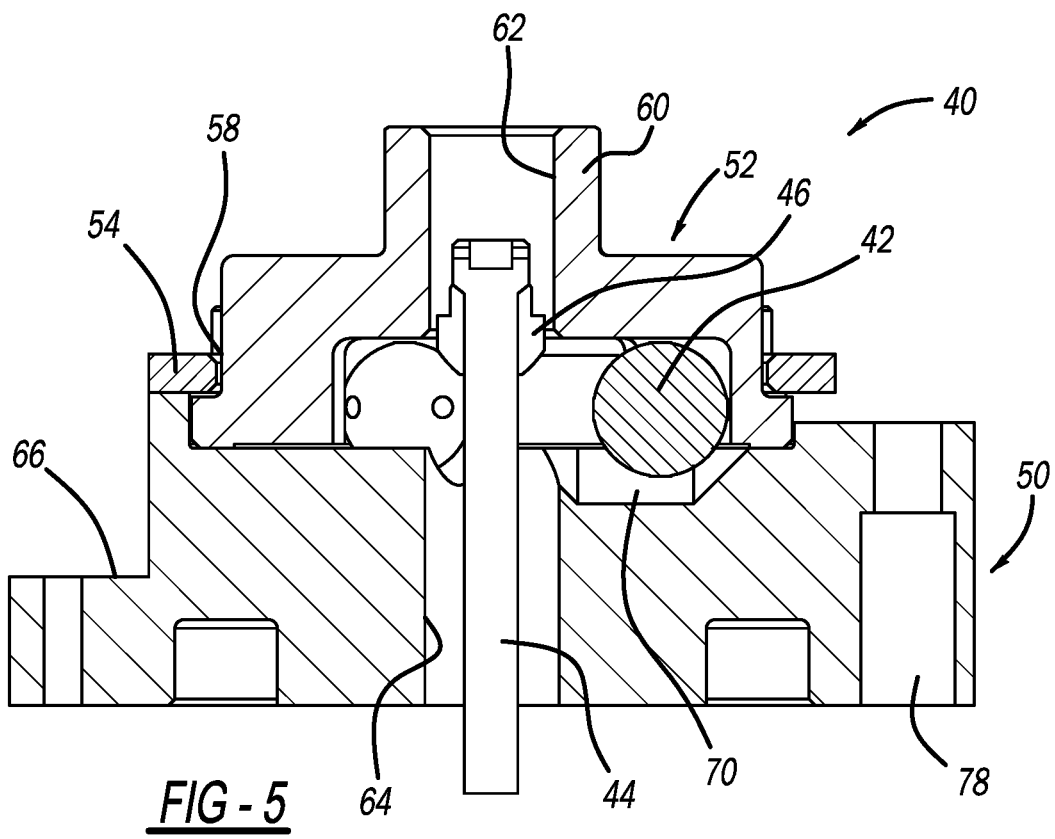
FIG. 5 is a cross-sectional view of the reusable release mechanism shown in FIG. 3 in an un-latched state.

FIG. 3 is an isometric view of reusable release mechanism 40, FIG. 4 is a cross-sectional view of the release mechanism 40 in a latched state, where three release balls 42 are shown positioned proximate a bolt 44 having a collar 46 as referred to above, and FIG. 5 is a cross-sectional view of the release mechanism 40 in an un-latched state, where the release balls 42 are shown positioned away from the bolt 44 as also referred to above. The mechanism 40 includes a base portion 50 and a circular rotatable portion 52 secured to the base portion 50 by a plate 54 bolted to the base portion 50 by bolts 56, where the rotatable portion 52 extends through a circular opening 58 in the plate 54. A nut 60 extends from a top of the rotatable portion 52 and has an opening 62 through which the bolt 44 can extend, where the nut 60 provides a mechanism for rotating the rotatable portion 52 by, for example, a wrench (not shown). The base portion 50 includes a central bore 64 in axial alignment with the opening 62 that also allows the bolt 44 to extend therethrough. The base portion 50 also includes flanges 66 that allow the mechanism 40 to be secured, here bolted, to the stationary structure, where the stationary structure and the release structure are not shown in FIGS. 3, 4 and 5.

Figure 6:
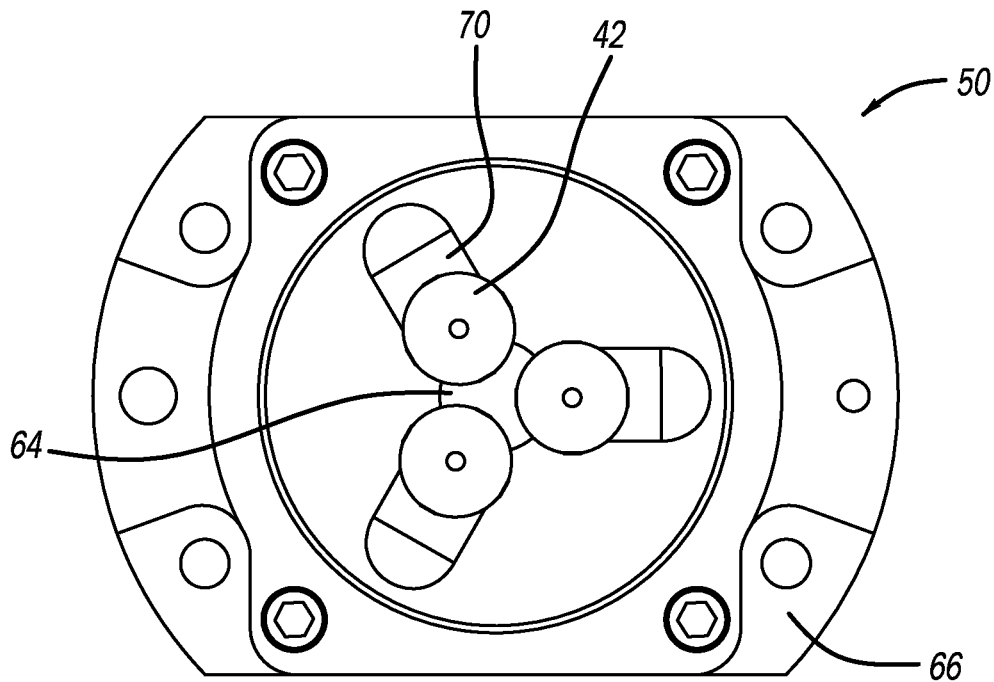
FIG. 6 is a top view of a base portion separated from the reusable release mechanism shown in FIG. 3 illustrating release balls in the latched state.
Figure 7:
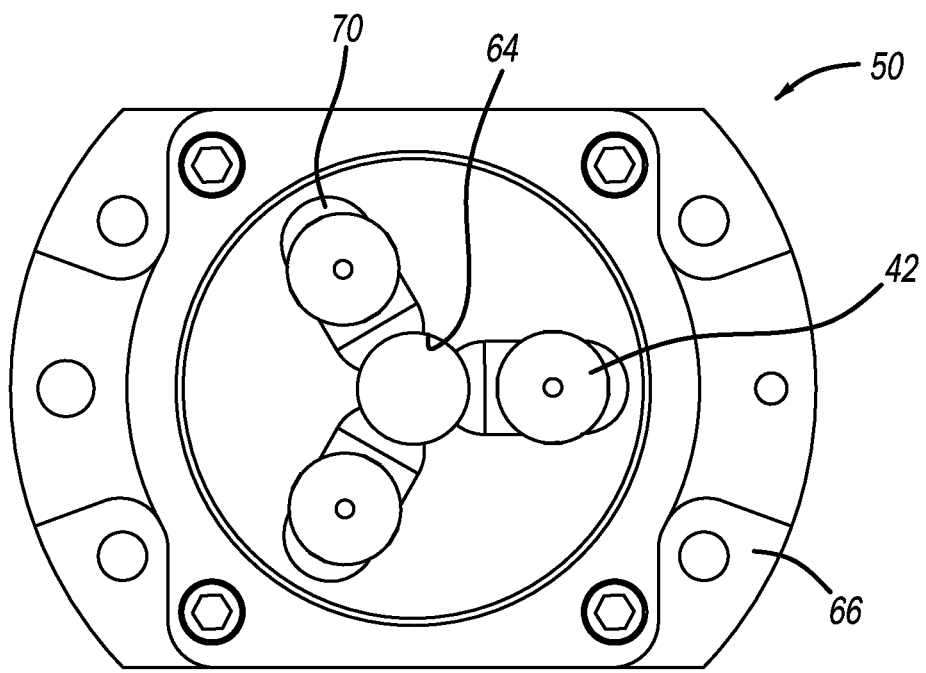
FIG. 7 is a top view of the base portion separated from the reusable release mechanism shown in FIG. 3 illustrating the release balls in the un-latched state.

FIG. 6 is a top view of the base portion 50 separated from the reusable release mechanism 40 illustrating the release balls 42 in the latched state, and FIG. 7 is a top view of the base portion 50 separated from the reusable release mechanism 40 illustrating the release balls 42 in the un-latched state. The base portion 50 includes three channels or rails 70 that radially extend outward from the bore 64 at 120° apart from each other that have a size so that the release balls 42 are able to set into and roll along the rails 70 in unison with each other. When the release balls 42 are pushed to an inside end of the rails 70 at a center of the base portion 50 proximate the central bore 64, the release balls 42 engage the collar 46 and the mechanism 40 is in the latched position, and when the release balls 42 are positioned an outside end of the rails 70 away from the center of the base portion 50, the release balls 42 disengage the collar 46 and the mechanism 40 is in the un-latched position.

Figure 8:
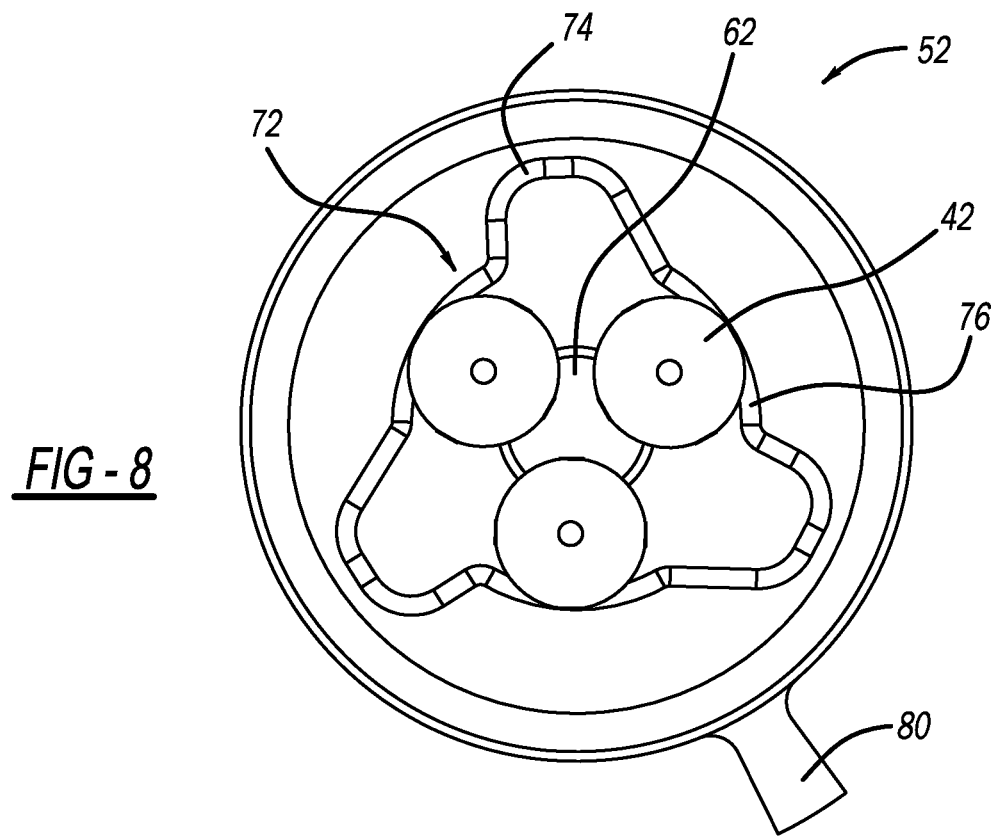
FIG. 8 is a bottom view of a rotating portion separated from the reusable release mechanism shown in FIG. 3 illustrating the release balls in the latched state.
Figure 9:
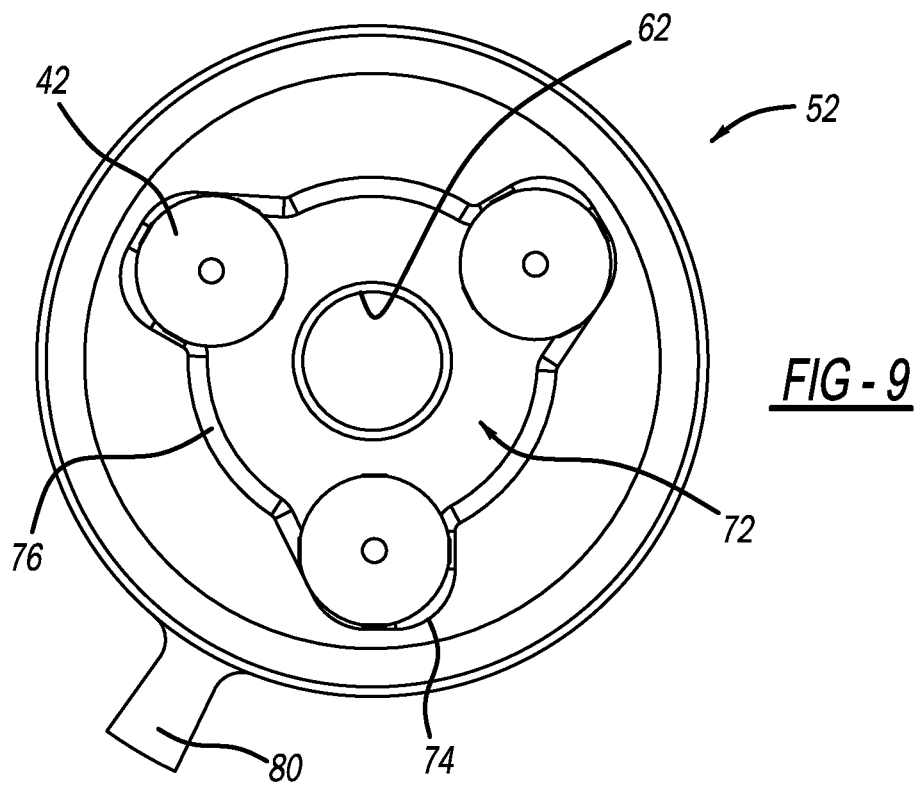
FIG. 9 is a bottom view of the rotating portion separated from the reusable release mechanism shown in FIG. 3 illustrating the release balls in the un-latched state.

FIG. 8 is a bottom view of the rotatable portion 52 separated from the reusable release mechanism 40 illustrating the release balls 42 in the latched state, and FIG. 9 is a bottom view of the rotatable portion 52 separated from the reusable release mechanism 40 illustrating the release balls 42 in the un-latched state. The rotatable portion 52 includes a cam indentation 72 formed in its bottom surface and including three pockets 74 spaced 120° apart from each other and three radii surfaces 76 therebetween, as shown. When the rotatable portion 52 is secured to the base portion 50 so that the release balls 42 are positioned adjacent to and in contact with the surfaces 76 and the balls 42 are at the center end of the rails 70 proximate to the bolt 44 and in contact with the collar 46, the releasable structure is secured to the stationary structure. When the rotatable portion 52 is rotated 120° relative to the base portion 50, such as clockwise, the pockets 74 will be lined up with the rails 70 and the balls 42 are allowed to move outward along the rails 70 by, for example, the force of the collar 46 pushing on the balls 42 towards the pockets 74, which releases the bolt 44, and thus the releasable structure from the stationary structure. If the bolt 44 can be repositioned in the mechanism 40, the rotatable portion 52 can be rotated 120° in the same or an opposite direction, where the cam indentation 72 pushes the release balls 42 along the rails 70 back towards the center bore 64, which will latch the balls 42 to the collar 46. Therefore, the release mechanism 40 can be reused to connect and disconnect the releasable structure to and from the stationary structure.

If the rotatable portion 52 was continually rotated in one direction, the release balls 42 would be caused to move inward and allowed to move outward along the rails 70 as the rotatable portion 52 rotates. In order to limit the rotation of the rotatable portion 52 and provide a mechanism for locking the rotatable portion 52 in the latched and/or unlatched position, the release mechanism 40 includes a stop block 82 that is secured to the base portion 50 by a pull pin 84 inserted into an orifice 78 and the rotating portion 52 includes a tab 80. When the rotatable portion 52 rotates, the tab 80 will engage the stop block 82 and hold the rotatable portion 52 so that the release balls 42 are locked or held in the latched or unlatched position.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A release mechanism comprising:
 a base portion including a plurality of equally spaced rails extending radially outward from a center of the base portion;
 a rotatable portion rotatably mounted to the base portion, said rotatable portion including a bottom surface having a cam indentation; and
 a plurality of release balls positioned between the base portion and the rotatable portion so that one of the release balls is ridable on each of the rails and all of the release balls are positioned within the cam indentation, said cam indentation being configured so that as the rotatable portion is rotated relative to the base portion the cam indentation causes the release balls to move along the rails to the center and allows the release balls to move outward away from the center in unison with each other.

2. The release mechanism according to claim 1 wherein the plurality of rails is three rails extending radially outward at 120° relative to each other and the number of release balls is three release balls.

3. The release mechanism according to claim 2 wherein the cam indentation includes three equally spaced pockets that the release balls are positioned in when the balls are at an end of the rails opposite to the center of the base portion, and radii surfaces between the pockets that the release balls are positioned against when the balls are at an end of the rails proximate to the center of the base portion.

4. The release mechanism according to claim 1 wherein the base portion and the rotatable portion include a central bore that accepts a bolt, said release balls being configured to hold the bolt when the balls are at an end of the rails proximate to the center of the base portion and release the bolt when the balls are at an end of the rails opposite to the center of the base portion.

5. The release mechanism according to claim 1 wherein the base portion includes a stop block and the rotatable portion includes a tab, said tab engaging the stop block when the rotatable portion is rotated to either hold the release balls at an end of the rails proximate to the center of the base portion or hold the release balls at an end of the rails opposite to the center of the base portion.

6. The release mechanism according to claim 5 wherein the stop block is secured to the base portion by a pull pin.

7. The release mechanism according to claim 1 wherein the rotatable portion includes a nut that accepts a wrench for rotating the rotatable portion.

8. The release mechanism according to claim 1 wherein the base portion is square and the rotatable portion is round.

9. A release mechanism for releasably securing a releasable structure to a stationary structure, said mechanism comprising:
 a base portion including three equally spaced rails extending radially outward from a center of the base portion and an opening extending through the center of the base portion;
 a rotatable portion rotatably mounted to the base portion and including an opening in axial alignment with the opening in the base portion, said releasable structure extending through the openings and said rotatable portion including a bottom surface having a cam indentation; and
 three release balls positioned between the base portion and the rotatable portion so that one of the release balls is ridable on each of the rails and all of the release balls are positioned within the cam indentation, said cam indentation being configured so that as the rotatable portion is rotated relative to the base portion the cam indentation causes the release balls to move along the rails to the center and allows the release balls to move outward away from the center in unison with each other so that when the release balls are at an end of the rails proximate to the center of the base portion the mechanism holds the releasable structure and when the release balls are at an end of the rails opposite to the center of the base portion the mechanism releases the releasable structure.

10. The release mechanism according to claim 9 wherein the cam indentation includes three equally spaced pockets that the release balls are positioned in when the balls are at the end of the rails opposite to the center of the base portion, and radii surfaces between the pockets that the release balls are positioned against when the balls are at the end of the rails proximate to the center of the base portion.

11. The release mechanism according to claim 9 wherein the base portion includes a stop block and the rotatable portion includes a tab, said tab engaging the stop block when the rotatable portion is rotated to either hold the release balls at an end of the rails proximate to the center of the base portion or hold the release balls at an end of the rails opposite to the center of the base portion.

12. The release mechanism according to claim 11 wherein the stop block is secured to the base portion by a pull pin.

13. The release mechanism according to claim 9 wherein the rotatable portion includes a nut that accepts a wrench for rotating the rotatable portion.

14. The release mechanism according to claim 9 wherein the base portion is square and the rotatable portion is round.

15. A release joint assembly comprising:
a stationary structure including an opening;
a releasable structure;
a bolt secured to the releasable structure and extending through the opening in the stationary structure; and
a release mechanism for releasing the releasable structure from the stationary structure, said release mechanism including a base portion having a center opening and a plurality of equally spaced rails extending radially outward from the center opening of the base portion, a rotatable portion rotatably mounted to the base portion, said rotatable portion including a center opening in axial alignment with the center opening in the base portion and a bottom surface having a cam indentation, said bolt extending through the axially aligned center openings, and a plurality of release balls positioned between the base portion and the rotatable portion so that one of the release balls is ridable on each of the rails and all of the release balls are positioned within the cam indentation, said cam indentation being configured so that as the rotatable portion is rotated relative to the base portion the cam indentation causes the release balls to move along the rails to the center and allows the release balls to move outward away from the center in unison with each other in manner so that the release structure is secured to the stationary structure when the release balls are positioned proximate the center openings and the release structure is released from the stationary structure when the release balls are at an end of the rails opposite to the center openings.

16. The joint assembly according to claim 15 wherein the plurality of rails is three rails extending radially outward at 120° relative to each other and the number of release balls is three release balls.

17. The joint assembly according to claim 16 wherein the cam indentation includes three equally spaced pockets that the release balls are positioned in when the balls are at an end of the rails opposite to the center of the base portion, and radii surfaces between the pockets that the release balls are positioned against when the balls are at an end of the rails proximate to the center of the base portion.

18. The joint assembly according to claim 15 wherein the base portion includes a stop block and the rotatable portion includes a tab, said tab engaging the stop block when the rotatable portion is rotated to either hold the release balls at an end of the rails proximate to the center of the base portion or hold the release balls at an end of the rails opposite to the center of the base portion.

19. The joint assembly according to claim 18 wherein the stop block is secured to the base portion by a pull pin.

20. The joint assembly according to claim 15 wherein the rotatable portion includes a nut that accepts a wrench for rotating the rotatable portion.

* * * * *